3,281,408
1-(2-AMINO-4-AZIDO-6-PHENYL-5-PYRIMIDINYL)-2-PROPANONE SEMICARBAZONE AND CONGENERS
Hans A. Wagner, Skokie, Ill., assignor to G. D. Searle & Co., Chicago, Ill., a corporation of Delaware
No Drawing. Filed Jan. 27, 1966, Ser. No. 523,519
5 Claims. (Cl. 260—154)

This invention relates to 1-(2-amino-4-azido-6-phenyl-5-pyrimidinyl)-2-propanone semicarbazone and congeners, and to a process for the preparation thereof. More particularly, this invention provides new, useful, and unobvious chemical compounds of the formula

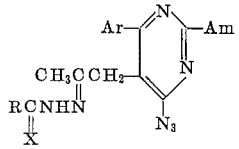

wherein Am represents an amino radial ($-NH_2$) which can be substituted by either 1 or 2 lower alkyl radicals; Ar represents a phenyl radical which can be substituted by 1 or more lower alkyl, halogen, and/or lower alkoxy radicals; X represents oxygen or sulfur; and R represents an amino, phenylamino, or phenylazophenyl radical.

Typical lower alkyl radicals are methyl, ethyl, propyl, isopropyl, butyl, isobutyl, sec-butyl, tert-butyl, pentyl, neopentyl, hexyl, isohexyl, heptyl, and like monovalent, saturated, acyclic, strength- or branched- chain, hydrocarbon groupings of empirical formula

wherein $n$ represents a positive integer less than 8.

Phenyl substituents within the ambit of Ar can amount to as many as 5, alike or different, albeit 1 or 2 such substituents are ordinarly preferred. Disposition of these substituents on the benzene ring relative to each other and to its attachment to the pyrimidine nucleus is not critical.

Those skilled in the art will recognize that 4-azidopyrimidines are disposed, under favorable conditions, to participate in a so-called azidomethine-tetrazole equilibrium [Temple et al., J. Org. Chem., 30, 829 (1965)]. The tetrazolo constituents of such an equilibrium mixture involving the instantly disclosed azidopyrimidines have the formula

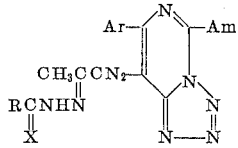

(Am, Ar, X, and R retaining the meanings previously assigned); and the relative amounts of the two tautomeric forms of the subject compounds in existence under any given circumstance are dependent upon the physical state of the involved substances and their environment—whether they be solid or liquid and, if dissolved, in what solvent, at what temperature, and at what pH. Because the various forms in which tautomers exist cannot readily be represented by a single formula, the subject compounds are named and enformulated exclusively as azides *for convenience only;* both azido and tetrazolo forms, notwithstanding, are within the ambit of the described invention.

The compounds to which this invention relates are useful by reason of their valuable pharmacological properties. Thus, for example, they inhibit exogenously induced hypercholesterolemia and counteract inflammatory edema.

Preparation of the subject compounds proceeds as follows: An appropriate ethyl aroylacetate

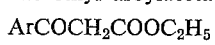

and halide $$HC \equiv CCH_2-halogen$$

(Ar being defined as before and the halogen called for being preferably chlorine or bromine) are heated together in the presence of sodium hydride or lower alkoxide, using dimethyl sulfoxide as solvent, to give the corresponding substituted ester

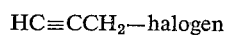

The latter ester, in turn, is condensed with an appropriate guanidine salt

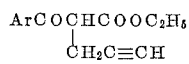

(Am being defined as before and A representing 1 equivalent of an appropriate anion such as chloride, carbonate, or sulfate) by heating in the presence of sodium methoxide, using ethyl or tert-butyl alcohol as solvent, to give the corresponding 4-pyrimidinol

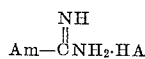

The pyrimidinol hydroxyl is replaced with chlorine via hot phosphorus oxychloride, and the resultant 4-chloropyrimidine is converted to the corresponding 4-azido compound by heating with sodium azide in dimethyl sulfoxide or aqueous ethyl alcohol. The propynyl side-chain therein is then hydrated with mercuric sulfate in aqueous sulfuric acid to give the acetonyl compound

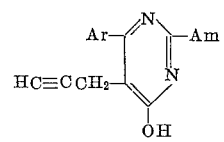

which, finally is heated with an appropriate semicarbazide

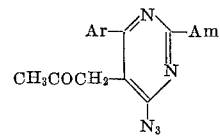

(R being defined as before) in absolute alcohol to produce the desired semicarbazone of this invention. Alternatively, a basic solvent such as pyridine is desirably substituted for the alcohol where the semicarbazide is introduced in the form of an acid addition salt.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

(A) *2-amino-6-phenyl-5-(2-propynyl)-4-pyrimidinol.*—A mixture of 230 parts of ethyl 2-benzoyl-4-pentynoate, 100 parts of guanidine hydrochloride, 56 parts of sodium methoxide, and 1200 parts of tert-butanol is heated at the boiling point under reflux for 18 hours, then stripped of solvent by vacuum distillation. The residue is mixed with 1500 parts of water, followed by 100 parts of glacial acetic acid. Insoluble solids are filtered off, washed with water, and dried in air. The product thus isolated is 2-amino-6-phenyl-5-(2-propynyl)-4-pyrimidinol.

(B) *2 - amino - 4 - chloro - 6 - phenyl - 5 - (2 - propynyl)pyrimidine.*—A mixture of 15 parts of 2-amino-6-phenyl - 5 - (2 - propynyl) - 4 - pyrimidinol and 40 parts of phosphorus oxychloride is heated at the boiling point under reflux for 35 minutes, then stirred into 1000 parts of ice. Stirring is continued for 15 minutes, at which point sufficient aqueous ammonium hydroxide is introduced to render the mixture alkaline, temperature being maintained below 5° by concomitant addition of ice. The resultant mixture is stirred for 15 minutes, at the end of which time insoluble solids are filtered off, washed with water, dried in air, and taken up in ether. The ether solution is consecutively washed with dilute aqueous ammonium hydroxide and water, dried over anhydrous sodium sulfate, and filtered. The filtrate is treated with decolorizing charcoal and solvent thereupon removed by vacuum distillation. The crystalline residue is 2-amino-4-chloro - 6 - phenyl - 5 - (2 - propynyl)pyrimidine melting at 175–177°.

(C) *2 - amino - 4 - azido - 6 - phenyl - 5 - (2 - propynyl)pyrimindine.*—A mixture of 20 parts of 2-amino-4-chloro-6-phenyl-5-(2-propynyl)pyrimidine, 7 parts of sodium azide, and 140 parts of dimethyl sulfoxide is stirred at 70° for 6 hours, whereupon heating is discontinued while stirring is maintained at room temperatures overnight. The resultant mixture is poured into 1400 parts of water, and the mixture thus obtained is stirred for 20 minutes. Insoluble solids are then filtered off, washed with cold water, dried in air, and taken up in the minimum amount of boiling methanol. The methanol solution is mixed with decolorizing charcoal and filtered. From the filtrate, on chilling, 2-amino-4-azido-6-phenyl-5-(2-propynyl)pyrimidine is precipitated as needles melting at approximately 190.5–191°.

(D) *5 - acetonyl - 2 - amino - 4 - azido - 6 - phenyl-pyrimidine.*—To 54 parts of 2-amino-4-azido-6-phenyl-5-(2-propynyl)pyrimidine dissolved in 500 parts of aqueous 65% acetic acid is added, with agitation, 22 parts of concentrated sulfuric acid, followed by a solution prepared by adding 8 parts of mercuric sulfate to 40 parts of water and then mixing in, consecutively, 25 parts of concentrated sulfuric acid and 100 parts of aqueous 65% acetic acid. The resultant solution is heated at 80° with continued agitation for 2 hours, then filtered. The filtrate is poured into 3000 parts of ice and water, whereupon sufficient ammonium hydroxide is added to induce basicity. The insoluble solids thrown down are filtered off, washed with water, dried in air, and recrystallized from methyl alcohol to give 5-acetonyl-2-amino-4-azido-6-phenyl-pyrimidine melting at approximately 188–189°.

(E) *1 - ( 2 - amino - 4 - azido - 6 - phenyl - 5 - pyrimidinyl)-2-propanone semicarbazone.*—A solution of 4 parts of 5-acetonyl-2-amino-4-azido-6-phenylpyrimidine and 4 parts of semicarbazide hydrochloride in 50 parts of pyridine is stirred at 60° for 1 hour, then poured into 400 parts of water. The solid thrown down is filtered off, washed with water, dried in air, and further purified by slurrying in hot methyl alcohol. Isolated by filtration and dried in air, the product thus obtained is 1-(2-amino-4-azido - 6 - phenyl - 5 - pyrimidinyl) - 2 - propanone semicarbazone melting at approximately 248° with gas evolution. The product has the formula

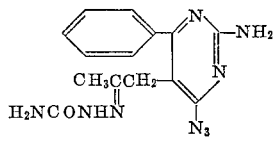

*Example 2*

*1 - (2 - amino - 4 - azido - 6 - phenyl - 5 - pyrimidinyl)-2-popanone thiosemicarbazone.*—A solution of 54 parts of 5-acetonyl-2-amino-4-azido-6-phenylpyrimidine and 20 parts of thiosemicarbazide in 1200 parts of absolute ethyl alcohol is heated at the boiling point under reflux for 1 hour, then treated with decolorizing charcoal and filtered. From the filtrate, on chilling, 1-(2-amino-4-azido-6-phenyl - 5 - pyrimidinyl) - 2 - propanone thiosemicarbazone crystallizes. The product, filtered off, washed with ether, and dried in air, melts at approximately 224–225° with gas evolution. It has the formula

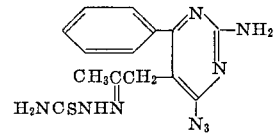

*Example 3*

*1 - (2 - amino - 4 - azido - 6 - phenyl - 5 - pyrimidinyl)-2-propanone 4-phenylsemicarbazone.*—A solution of 54 parts of 5-acetonyl-2-amino-4-azido-6-phenylpyrimidine and 38 parts of phenylsemicarbazide hydrochloride in 500 parts of pyridine is heated at 70° for 4 hours, then stirred into 4000 parts of water. The insoluble solids thrown down are filtered off, washed with ether, and dried in air, to give 1-(2-amino-4-azido-6-phenyl-5-pyrimidinyl)-2-propanone 4-phenylsemicarbazone melting at approximately 224–225° with gas evolution. The product has the formula

*Example 4*

*1 - (2 - amino - 4 - azido - 6 - phenyl - 5 - pyrimidinyl)-2-propanone 4 - (p - phenylazophenyl)semicarbazone.*—A mixture of 54 parts of 5-acetonyl-2-amino-4-azido-6-phenylpyrimidine, 52 parts of 4-(p-phenylazophenyl)semicarbazide, 40 parts of acetic acid, and 1200 parts of absolute ethyl alcohol is heated at the boiling point under reflux with agitation for 4 hours, then allowed to stand in the cold. 1 - (2 - amino - 4 - azido - 6 - phenyl - 5 - pyrimidinyl)-2-propanone 4 -(p-phenylazophenyl)semicarbazone crystallizes out. Isolated by filtration, washed with ether, and dried in air, it melts at approximately 220–221° with gas evolution. The product has the formula

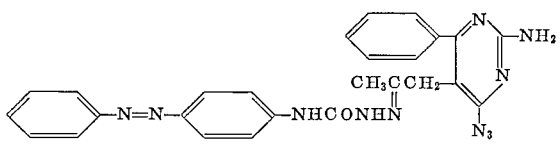

What is claimed is:
1. A compound of the formula

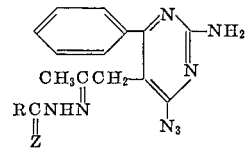

wherein R is selected from the group consisting of amino, phenylamino, and p-(phenylazophenyl)amino; and Z is selected from the group consisting of oxygen and sulfur.

2. A compound according to claim 1 which is 1-(2-amino-4-azido-6-phenyl-5-pyrimidinyl)-2-propanone semicarbazone.

3. A compound according to claim 1 which is 1-(2-amino-4-azido-6-phenyl-5-pyrimidinyl)-2-propanone thiosemicarbazone.

4. A compound according to claim 1 which is 1-(2-amino - 4 - azido - 6 - phenyl - 5 - pyrimidinyl) - 2 - propanone 4-phenylsemicarbazone.

5. A compound according to claim 1 which is 1-(2-amino - 4 - azido - 6 - phenyl - 5 - pyrimidinyl) - 2 - propanone 4-(p-phenylazophenyl)semicarbazone.

No references cited.

ALEX MAZEL, *Primary Examiner.*

MARY U. O'BRIEN, *Assistant Examiner.*